US010988961B2

(12) United States Patent
Krause et al.

(10) Patent No.: US 10,988,961 B2
(45) Date of Patent: Apr. 27, 2021

(54) SAFETY DEVICE FOR BONNETS COMPRISING AN ELECTRIC DRIVE AND LOCKABLE ACTUATOR

(71) Applicant: Kiekert AG, Heiligenhaus (DE)

(72) Inventors: Karl Krause, Cologne (DE); Thorsten Nottebaum, Mühltal (DE); Johannes Theodor Menke, Velbert (DE); Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 612 days.

(21) Appl. No.: 15/756,817

(22) PCT Filed: Sep. 30, 2016

(86) PCT No.: PCT/DE2016/100457
§ 371 (c)(1),
(2) Date: Mar. 1, 2018

(87) PCT Pub. No.: WO2017/054804
PCT Pub. Date: Apr. 6, 2017

(65) Prior Publication Data

US 2018/0252007 A1 Sep. 6, 2018

(30) Foreign Application Priority Data

Oct. 2, 2015 (DE) ..................... 10 2015 116 775.1

(51) Int. Cl.
*E05B 83/24* (2014.01)
*E05B 63/24* (2006.01)
(Continued)

(52) U.S. Cl.
CPC .............. *E05B 83/24* (2013.01); *E05B 63/24* (2013.01); *E05B 81/14* (2013.01); *E05B 81/20* (2013.01);
(Continued)

(58) Field of Classification Search
CPC .......... E05B 83/24; E05B 63/24; E05B 85/04; E05B 85/045; E05B 81/14; E05B 81/20;
(Continued)

(56) References Cited

U.S. PATENT DOCUMENTS 301,804 A * 7/1884 Chevremont ........... E05F 11/00 292/207
1,599,256 A * 9/1926 Viehweger ............ E05B 63/122 70/106
(Continued)

FOREIGN PATENT DOCUMENTS

DE 198 12 835 A1 9/1999
DE 10058044 * 6/2002
(Continued)

OTHER PUBLICATIONS

International Search Report and Written Opinion for corresponding Patent Application No. PCT/DE2016/100457 dated Feb. 21, 2017.

*Primary Examiner* — Carlos Lugo
(74) *Attorney, Agent, or Firm* — Renner, Otto, Boisselle & Sklar, LLP

(57) ABSTRACT

A safety device for a motor vehicle includes a bonnet with an open and closed position, a bonnet lock with a lock retainer and a rotary latch, and an electric drive which shifts the rotary latch from a main locking position into a preliminary locking position. The lock retainer has an actuator, wherein in a first position of the actuator and in the preliminary locking position of the rotary latch, the lock retainer engages with the rotary latch and the bonnet is locked, and in a second position of the actuator, the lock retainer is released by the rotary latch and the bonnet is unlocked. The bonnet is coupled to the actuator such that in the preliminary locking position of the rotary latch a displacement of the bonnet towards the closed position of the bonnet causes a displacement of the actuator from the first position into the second position.

9 Claims, 5 Drawing Sheets

Figure 1:
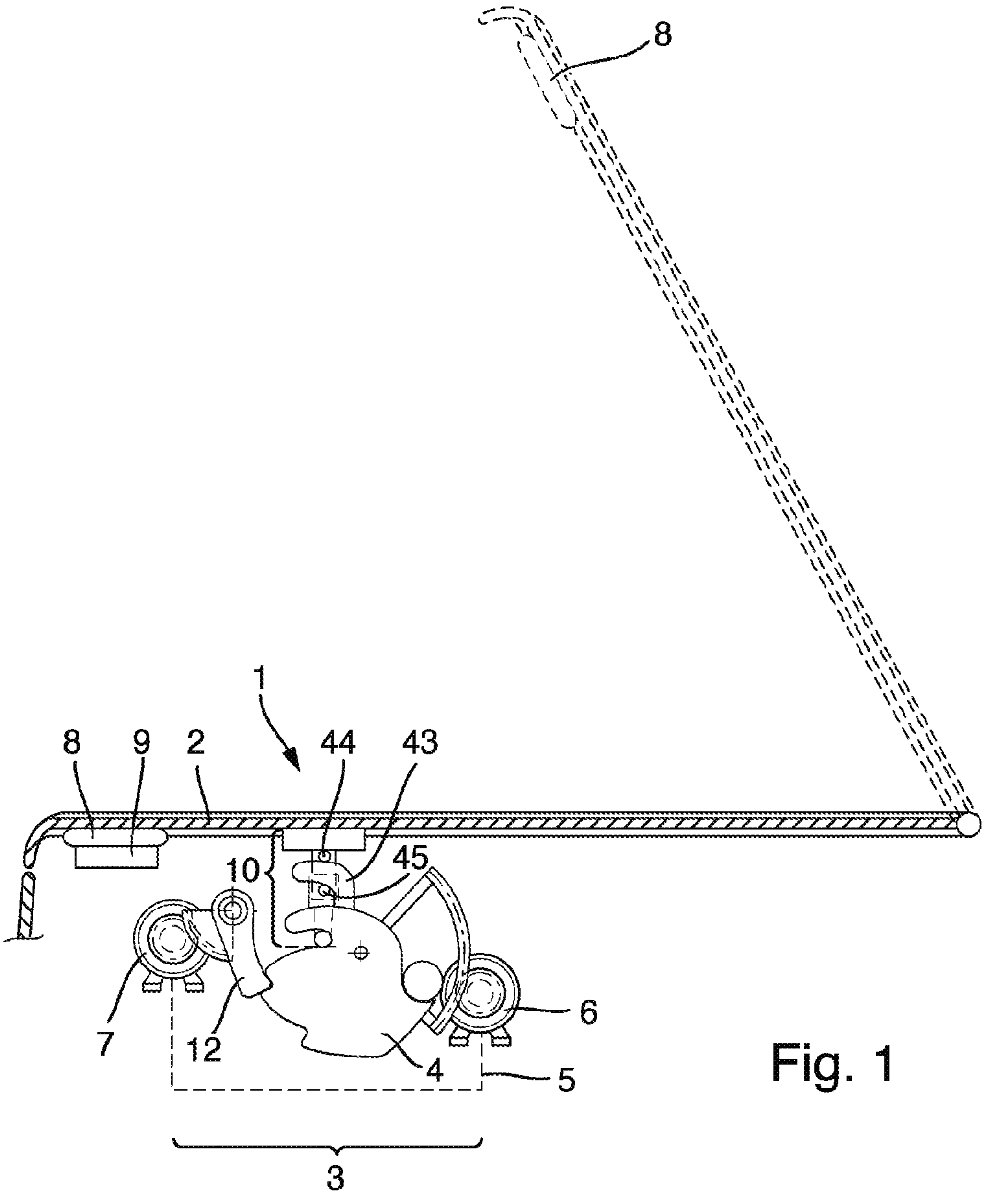

(51) Int. Cl.
*E05B 81/14* (2014.01)
*E05B 81/20* (2014.01)
*E05B 85/04* (2014.01)

(52) U.S. Cl.
CPC ........... *E05B 85/045* (2013.01); *Y10S 292/14* (2013.01); *Y10T 292/68* (2015.04); *Y10T 292/696* (2015.04)

(58) Field of Classification Search
CPC .... Y10S 292/14; Y10S 292/42; Y10T 292/14; Y10T 292/68; Y10T 292/696; Y10T 292/1089; Y10T 292/03; Y10T 292/0814; Y10T 292/0815; Y10T 292/0816
USPC ............................................. 180/69.2, 69.21
See application file for complete search history.

(56) References Cited

U.S. PATENT DOCUMENTS

| | | | | | |
|---|---|---|---|---|---|
| 1,618,851 | A * | 2/1927 | Thunberg | F16G 11/10 | 403/165 |
| 1,667,732 | A * | 5/1928 | Henson | E05B 83/243 | 70/240 |
| 2,486,003 | A * | 10/1949 | Christensen | E05B 63/244 | 292/59 |
| 2,786,383 | A * | 3/1957 | Bachman | F16B 21/165 | 411/348 |
| 3,219,374 | A * | 11/1965 | Snell | E05C 17/52 | 292/15 |
| 3,561,516 | A * | 2/1971 | Reddy | F16B 21/088 | 411/347 |
| 4,618,180 | A * | 10/1986 | Muscat | B60J 7/1851 | 292/241 |
| 5,046,768 | A * | 9/1991 | Myslicki | E05B 83/24 | 292/68 |
| 5,247,817 | A * | 9/1993 | Korner | E05B 63/20 | 292/DIG. 14 |
| 7,331,616 | B2 * | 2/2008 | Brei | E05B 47/0009 | 292/100 |
| 7,998,232 | B2 * | 8/2011 | Krueger | F02M 35/161 | 55/385.3 |
| 8,083,270 | B2 * | 12/2011 | Hwang | E05B 77/08 | 292/128 |
| 2014/0088826 | A1 | 3/2014 | Wheeler et al. | | |

FOREIGN PATENT DOCUMENTS

| | | | | |
|---|---|---|---|---|
| DE | 10301998 | A1 * | 7/2004 | E05B 81/20 |
| DE | 10312292 | A1 | 9/2004 | |
| DE | 102005034098 | A1 * | 1/2007 | E05B 77/08 |
| DE | 10 2005 044079 | A1 | 3/2007 | |
| DE | 10 2005 057820 | A1 | 6/2007 | |
| DE | 102007001715 | A1 * | 7/2008 | E05B 77/36 |
| DE | 10 2007 061544 | A1 | 6/2009 | |
| DE | 10 2010 061518 | A1 | 4/2012 | |
| DE | 102014205370 | A1 | 9/2015 | |
| DE | 102014205371 | A1 | 9/2015 | |
| DE | 102015203517 | A1 * | 9/2016 | B60R 21/38 |
| WO | 2007/031267 | A1 | 3/2007 | |
| WO | 2015/113546 | A1 | 8/2015 | |

* cited by examiner

SAFETY DEVICE FOR BONNETS COMPRISING AN ELECTRIC DRIVE AND LOCKABLE ACTUATOR

The invention relates to a safety device having a front hood and a hood latch with a latch holder for a motor vehicle.

Such a safety device is known from DE 198 12 835 A1. The safety device described therein has an arrester hook operating arrangement which is executed by means of a lever construction and in which no rotational constructional elements occur. This safety device is thus characterized by a very simple construction. A first step to unbolt a front hood is usually enabled by means of operating a Bowden cable from the vehicle interior. Thus, for example, in DE 10 2007 061 544 A1 an operating lever is described for unbolting a motor hood which is arranged in the passenger compartment and is mechanically connected to a hood latch by means of a Bowden cable. Furthermore, DE 10 2005 044 079 A1 reveals unbolting of a hood latch by means of a Bowden cable.

Use of a Bowden cable has the disadvantage that this needs to be conducted around several components in the engine compartment starting from the vehicle interior to the front area of the front hood in which the hood latch is arranged, which requires space in the engine compartment and less space is thus available for arrangement of these components in the engine compartment. According to the state of the art, the safety device thus limits options to arrange other components and is therefore impractical from a manufacturing and constructional perspective. Use of the Bowden cable to unbolt the front hood is also impractical for an operator as he must feel for one end of the Bowden cable when searching for it which is usually located beneath a dashboard and can only move the Bowden cable with considerable physical effort.

It is therefore a task of the present invention to create a safety device of the type stated above which is more practical compared to a previously known safety device.

According to the invention, this task is solved by a safety device with the characteristics of patent claim 1. Advantageous designs with expedient further formations of the invention result from the remaining patent claims, the description and the figures.

In order to create a safety device which is more practical compared to a previously known safety device, a safety device for a motor vehicle is provided for which has a front hood and a hood latch with a latch holder, whereby the hood latch comprises a catch with a pre-ratchet position and a main ratchet position and an electrical drive. The electrical drive causes switchover of the catch from the main ratchet position to the pre-ratchet position. The front hood is bolted and closed in the main ratchet position. Furthermore, the hood latch has a bayonet latching system with a closure position, a release position and an intermediate position, whereby the catch is in the main ratchet position in the closure position. In the intermediate position the catch is located in the pre-ratchet position and the latch holder engages with the catch. In the release position the latch holder is released from the catch and the front hood is unbolted and the catch is preferably located in the pre-ratchet position.

The electrical drive can preferably be controlled, switched on and/or switched off and can preferably be rotatably controlled into a first direction and optionally into a second direction which is opposite the first by means of a switch and/or a control device which is connected to the electrical drive by means of at least one cable. In particular, a rotational movement of the electrical drive causes switchover of the catch from the main ratchet position to the pre-ratchet position. Due to the fact that the electrical drive is connected to the switch and/or the control device by means of a cable, a Bowden cable conducted through the engine compartment to unbolt the front hood can be dispensed with which facilitates the arrangement of other components in the engine compartment. A switch which operates the electrical drive can also be arranged at any position on a motor vehicle dashboard so that the safety device is easier to unbolt and therefore more practical for an operator.

In the main ratchet position the catch is locked in an opening rotational direction which is specified by a rotation of the catch from the main ratchet position into the pre-ratchet position. The catch has a, preferably fork-shaped, infeed section which is formed by a load arm and a collecting arm. In the main ratchet position the infeed section encompasses the latch holder in such a way that manual release of the latch holder is blocked, i.e. that the latch holder cannot be moved manually if the catch is located in the main ratchet position and is especially not purely mechanically detachable with a handle. The latch holder can be executed as a bolt, a pin or a latch bracket. In particular, the latch holder is blocked in the main ratchet position by means of the load arm. The latch holder can generally be viewed as a detachable connecting element between the catch and the front hood which interacts directly with the catch and can be bolted and unbolted with the aid of the catch, whereby bolting or unbolting of the latch holder causes bolting or unbolting of the front hood.

According to an advantageous embodiment, the latch holder is arranged on the front hood and the catch and the bayonet latching system are arranged on a stationary component of the safety device. In a different embodiment, the latch holder can also be arranged on a stationary component of the safety device and the catch and preferably the bayonet latching system can be arranged on the front hood. The greater mass inertia of the front hood can thus reduce a bouncing effect of the front hood which preferably counteracts the load arm of the catch in the pre-ratchet position during closure of the hood.

By means of the electrical drive of the hood latch an arrangement of the catch on the front hood can be easier to execute as only a cable needs to be conducted along the movable front hood in this embodiment instead of a Bowden cable. Furthermore, an arrangement of the catch on the front hood can be advantageous from a manufacturing perspective to the extent that the catch and the electrical drive can be better mounted on an individual front hood than in an already equipped engine compartment.

The hood latch preferably has a catch blocking element, such as a pawl, which locks the catch in the main ratchet position and/or the pre-ratchet position, whereby locking means a blocking of the catch in the opening rotational direction. Furthermore, it is within the scope of the invention that the catch has a pre-ratchet contour and a main ratchet contour which can interact respectively independently of one another with a counterratchet contour of the catch blocking element during rotation of the catch in the opening rotational direction and into a closure rotational direction which is oriented opposite to the opening rotational direction.

Especially advantageously, the pre-ratchet contour or the main ratchet contour passes the counterratchet contour of the pawl during rotation of the catch in the closure rotational direction. If the pre-ratchet contour or the main ratchet contour is located in front of the counterratchet contour of the pawl viewed in the closure rotational direction, the counterratchet contour preferably ratchets in a spring-impinged manner into the pre-ratchet contour or the main ratchet contour and blocks rotation of the catch in the opening rotational direction, whereby the catch assumes the pre-ratchet position or the main ratchet position. Advantageously, a catch spring element acts on the catch in the opening rotational direction, whereby the pre-ratchet contour or the main ratchet contour is held pressed against the counterratchet contour in the pre-ratchet position or the main ratchet position accordingly. The catch spring element can be tensioned during movement of the front hood in the direction of the closure position whereby the latch holder touches the catch. A tensioned catch spring element can enable an independently driven switchover of the catch from the main ratchet position into the pre-ratchet position, whereby such switchover can be triggered by means of the electrical drive, for example by means of driving of the catch blocking element.

A special configuration envisages that the catch cannot be moved beyond the pre-ratchet position without locking by means of the pawl in the opening rotational direction, i.e. that the catch has an opening end position with the pre-ratchet position. In a different embodiment, the catch has an opening end position in which the catch is rotated into the opening rotational direction from the pre-ratchet position.

The front hood is closed in the main ratchet position of the catch. Closed means that the front hood, which can be moved in a first direction into an open position and in a second direction, opposite to the first, to a closure position, is located in the closure position. In particular, it is envisaged when the front hood is closed that an elastic element of the safety device, such as a sealing rubber which borders the front hood in the closure position or is arranged on the front hood, is compressed. A front hood for the purpose of the invention means a hood which is arranged in front of a windscreen of the motor vehicle in the direction of the motor vehicle.

Starting from the main ratchet position of the catch, the electrical drive causes switchover of the catch from the main ratchet position into the pre-ratchet position during its activation or control. The electrical drive can, for example, be activated from the vehicle interior or the vehicle exterior by means of remote control. In the pre-ratchet position of the catch, the latch holder can be moved between a closure position in which the latch holder engages with the catch and an opening position in which the latch holder is released by the catch. The catch is blocked in the pre-ratchet position, preferably by means of the pawl, in the opening rotational direction. By means of this engagement, the catch blocks a movement of the front hood in the direction of the opening position if the latch holder is in the closure position which corresponds to bolting of the front hood. However, the front hood is not closed in the pre-ratchet position of the catch.

In one embodiment in which the latch holder is arranged on the front hood, in the pre-ratchet position and in the closure position of the latch holder the catch blocks a movement of the latch holder, at least into a blocking direction which corresponds to a movement of the front hood in the direction of the open position and is preferably fundamentally aligned vertically to a motor vehicle lengthwise axis.

During switchover from the main ratchet position into the pre-ratchet position, the catch preferably moves the front hood in the direction of the open position of the front hood by means of the latch holder. During this movement of the front hood an engagement area is preferably provided to seize a handle for the bayonet latching system.

The switchover of the catch from the main ratchet position into the pre-ratchet position is caused by means of the electrical drive according to the invention, which preferably has a pinion shaft. This can be executed in a special design by means of a triggering lever which is acted on by means of the pinion shaft of the electrical drive, whereby the triggering lever causes unratcheting of the catch from the main ratchet position during movement of the pinion shaft. For example, the triggering lever can move the pawl against a spring force which acts on the pawl and move the counterratchet contour away from the main ratchet contour or release it from the ratchet position, whereby in a particular embodiment the catch is moved from the main ratchet position into the pre-ratchet position by means of the tensioned catch spring element. According to this, causing of the switchover of the catch from the main ratchet position into the pre-ratchet position also encompasses triggering of this switchover for the purpose of the invention.

It is furthermore possible that the triggering lever releases a pre-tensioned force spring during movement of the pinion shaft which unratchets the pawl against its spring impingement. The advantage of this variant is that the electrical drive can have smaller dimensions as only the pre-tensioned force spring needs to be detached by means of the drive. However, in this design an additional gearbox can be necessary to tension the force spring by means of the electrical drive. Advantageously the force spring can be tensioned during rotation of the catch in the closure rotational direction, preferably assisted by weight force by means of a movement of the front hood in the direction of the closure position.

A further design can envisage that the pinion shaft of the electrical drive acts directly on the pawl and during activation of the electrical drive the counterratchet contour unratchets the pawl from the main ratchet contour. The advantage of this design is that no transmission element is necessary between the pinion shaft and the pawl.

An especially advantageous variant envisages mechanical coupling between the bayonet latching system and the latch holder. In the present case, the mechanical coupling may be formed in such a way that adjustment of the bayonet latching system from the intermediate position to the release position corresponds with an adjustment of the latch holder from the closure position to the opening position. Especially advantageously in the pre-ratchet position of the catch the latch holder can be moved by means of the mechanical coupling with the aid of the bayonet latching system into the opening position, whereby unbolting of the front hood is caused.

Starting from a closed state of the front hood, dual operation of the safety device is provided to unbolt the front hood. On the one hand, activation of the electrical drive to switch over the catch from the main ratchet position into the pre-ratchet position and on the other hand transmission of the bayonet latching system from the intermediate position to the release position. This redundancy lends this variant of the safety device greater safety compared to a safety device without additional operation of a bayonet latching system or without operation of an electrical drive.

In a special embodiment, the bayonet latching system can be transferred manually from the intermediate position to the release position. Manually transferred means in particular solely mechanically, i.e. without electricity or electrical aids.

The bayonet latching system is preferably maintained in the intermediate position in a spring-impinged manner. Such spring impingement has the advantage that the necessary physical effort is reduced for an operator compared to an embodiment without a bayonet latching system with spring impingement to adjust the latch holder from the closure position to the opening position and thus the operating convenience of the safety device is increased. On the one hand, adjustment of the bayonet latching system can be triggered from the intermediate position to the release position by means of a triggering lever, whereby the triggering lever can be manually moved, in particular for an operator of the safety device. The triggering lever preferably releases a tensioned drive spring which moves the bayonet latching system from the intermediate position to the release position.

On the other hand, an adjustment of the bayonet latching system from the intermediate position to the release position can be provided for by means of a manually movable handle. In other words, the bayonet latching system can be manually adjusted by an operator in the pre-ratchet position of the catch, and can, in particular, be mechanically detachable. Provision of manual access to the bayonet latching system during switchover of the catch from the main ratchet position into the pre-ratchet position is provided for in an especially advantageous manner. After switchover of the catch, for example, the handle can be reached by means of a raised front hood.

In a further formation the catch follows, at least partly, adjustment of the bayonet latching system from the intermediate position to the release position by means of rotation in an opening rotational direction. This design of the catch can preferably be detached manually from the pre-ratchet position. In one embodiment with especially high levels of safety the front hood can be unbolted starting from the pre-ratchet position of the catch by means of at least dual manual operation, on the one hand by means of manual detachment of the catch from the pre-ratchet position and, on the other hand, by means of manual transfer of the bayonet latching system from the intermediate position to the release position.

A further design can provide for the catch rotating in a spring-impinged manner in the opening rotational direction by means of manual detachment of the catch from the pre-ratchet position and moving the bayonet latching system from the intermediate position to the release position in the process. In this case, the bayonet latching system can be indirectly manually transferred from the intermediate position to the release position by means of detachment of the catch from the pre-ratchet position.

In the release position of the bayonet latching system the latch holder is located in the opening position and is released by the catch. Blockage of a movement of the front hood is thus cancelled in the direction of the open position which corresponds to unbolting of the front hood. The latch holder is preferably held in the closure position in a spring-impinged manner and can be accommodated or arrested by means of the collecting arm of the catch when the front hood falls shut.

Within the scope of an especially preferred variant, the safety device has a mechanical operative connection between the electrical drive and the catch during switchover of the catch from the main ratchet position into the pre-ratchet position. Advantageously, the safety device provides a force-transmitting operative connecting chain in every intermediate position of the catch between the main ratchet position and the pre-ratchet position starting from the electrical drive by means of the catch to the latch holder.

For example, the mechanical operative connection can be formed by a pinion gearwheel which is connected to the pinion shaft of the electrical drive in a form-fitting manner and a drive gearwheel which is connected to the catch in a form-fitting manner, whereby the pinion shaft gearwheel combs with the drive gearwheel. Driving of the catch with the aid of the electrical drive during switchover from the main ratchet position into the pre-ratchet position enables smaller dimensioning of the catch spring element, whereby space can be saved in direct proximity to the catch. A special design of the safety device can even provide for no catch spring element at all. The electrical drive can preferably be operated in generator mode in order to form mechanical resistance of the catch against a movement of the front hood in the direction of the closure position during arresting of the front hood with the aid of the catch.

In a further embodiment, the mechanical operative connection can be formed by means of a wormgear which is connected to the pinion shaft of the electrical drive in a form-fitting manner and a wormgear wheel which is connected to the catch in a form-fitting manner, whereby the wormgear engages into the wormgear wheel. In any case, mechanical operative connection means that a movement of the pinion shaft directly causes movement of the catch, i.e. the pinion shaft is mechanically coupled with the catch.

By means of the mechanical operative connection between the electrical drive and the catch it is possible and is within the scope of the invention that a movement of the front hood in the direction of the open position can be controlled during switchover of the catch from the main ratchet position into the pre-ratchet position, i.e. that both starting acceleration of the front hood and also braking acceleration can be controlled shortly before attainment of the pre-ratchet position of the catch, whereby the starting acceleration and the braking acceleration are advantageously asymptomatic over the time. For example, the braking acceleration on approximation of the catch to the pre-ratchet position asymptomatically over time can be reduced to zero, whereby overshooting of the front hood after the catch has reached the pre-ratchet position can be minimized. Thus, the hood or the triggering lever is easier to grasp to operate the bayonet latching system and more convenient unbolting of the front hood can be provided, in particular if an operator is located directly in front of the front hood and activates the electrical drive by means of remote operation.

A further variant of the invention envisages that the safety device has a mechanical operative connection between the electrical drive and the catch during switchover of the catch from the main ratchet position into the pre-ratchet position. The mechanical operative connection can be formed as described above, i.e. for example by means of a pinion shaft gearwheel and a drive gearwheel or by means of a wormgear and a wormgear wheel.

The mechanical operative connection between the electrical drive and the catch during switchover of the catch from the pre-ratchet position into the main ratchet position causes a more powerful and, in particular, a controllable ratcheting of the catch into the main ratchet position compared to the state of the art. A more powerful and in particular a controllable ratcheting of the catch enables execution of a smaller gap dimension between the front hood in the closed state and a further chassis section adjacent to the front hood, for example a headlight. Advantageously, a force transmission from the electrical drive to the catch is provided which increases during approximation of the catch to the main ratchet position. The elastic element which is adjacent to the front hood when the front hood is closed can thus be compressed, controlled by the electrical drive.

Especially advantageously, the catch can be held in a position by means of the mechanical operative connection between the electrical drive and the catch during switchover of the catch from the pre-ratchet position into the main ratchet position in which the main ratchet contour is located directly in front of the counterratchet contour of the pawl during a ratcheting process in the closure rotational direction. Holding of the catch in this position, for 10 to 100 milliseconds, for example, enables the ratcheting process of the counterratchet contour into the main ratchet contour to be considerably delayed compared to embodiments according to the state of the art. With regard to the safety devices according to the state of the art, a pawl spring which moves the counterratchet contour into the main ratchet contour by means of the pawl is configured in such a way that it moves the pawl so quickly within a possible ratcheting period which starts during rotation of the catch in the closure rotational direction with passing of the main ratchet contour on the counterratchet contour and ends with passing of the main ratchet contour on the counterratchet contour during rotation of the catch in the opening rotational direction that the counterratchet contour ratchets into the main ratchet contour within the possible ratcheting period. This demands corresponding spring force which needs to be greater the shorter the ratcheting period. According to the state of the art, one possibility is to increase the ratcheting period by a gap dimension being increased between the front hood in the closed state and the further chassis part as the distance covered by the main ratchet contour within the ratcheting period is increased. Manual holding of the front hood would require excessive physical effort in the case of a low gap dimension in a position in which the main ratchet contour is located directly in front of the counterratchet contour of the pawl during a ratcheting process in the closure rotational direction.

By means of the mechanical operative connection between the electrical drive and the catch during switchover of the catch from the pre-ratchet position into the main ratchet position the duration of the ratcheting period can be increased at will as the catch can be held by means of the electrical drive in any position for any period. Smaller dimensioning of the pawl spring is thus possible, which saves weight and material costs. The gap dimension between the front hood and the further chassis part can also be considerably reduced as the ratcheting period is no longer dependent on the gap dimension. Such a safety device is therefore more practical from a manufacturing and constructional perspective than one according to the state of the art.

Especially advantageously a gap dimension between the closed front hood and at least the further chassis element can be changed by means of the elastic element which can be compressed in a controlled manner, whereby it is possible to offset manufacturing tolerances which have an impact on a gap dimension between the front hood and the further chassis element. This constitutes a simplification from a manufacturing perspective. In detail, this can be executed with a main ratchet contour of the catch which is adjustable along the opening or closure rotational direction. For example, the main ratchet contour can be arranged on a disk independently of the pre-ratchet contour which can be locked in the opening rotational direction or the closure rotational direction by means of ratchet elements. In detail, the ratchet elements can be locked in adjustable ratchet positions by means of tightening, for example by means of a screw.

In a further design it is envisaged that the electrical drive causes adjustment of the bayonet latching system from the closure position into the intermediate position. The electrical drive can cause adjustment of the bayonet latching system, similarly to for causing of switchover of the catch from the main ratchet position into the pre-ratchet position. For example, the electrical drive can, as already described above, act on an additional pawl by means of a triggering lever, whereby the bayonet latching system is pre-tensioned and is held by means of the additional pawl. Furthermore, direct action on the additional pawl or release of a pre-tensioned force spring which acts on the additional pawl can be provided for by means of the electrical drive or an additional mechanical operative connection between the electrical drive and the bayonet latching system. The additional mechanical operative connection can be formed as described above, i.e. for example by means of a pinion shaft gearwheel and a drive gearwheel or by means of a wormgear and a wormgear wheel.

An advantageous embodiment provides for the bayonet latching system having at least a first latching element and a second latching element, whereby the first latching element is executed adjustably to the second latching element. For an exemplification which is not restrictive, however, it is supposed hereafter that the first latching element is rotatably arranged on a stationary component of the safety device. According to the position of the bayonet latching system, the second latching element preferably forms a contact with the latch holder or is spatially separate from the latch holder. For example, a contact can be a loose contact, whereby the latch holder and the second latching element touch on a contact surface or a contact point. Furthermore, a contact can also be implemented by means of a mechanical coupling, whereby the latching element and the latch holder engage into one another, for example.

In an advantageous execution, the second latching element is spatially separate from the latch holder in the closure position and forms a contact with the latch holder in the intermediate position. In the release position in one design, a contact can preferably exist between the second latching element and the latch holder for a short time, i.e. lasting 0.01 to 1 second during unbolting of the front hood. In a different embodiment, in the release position to elevation of the front hood for opening of the front hood a contact must be produced between the second latching element and the latch holder.

Adjustability between the first and the second latching element is preferably executed by the first latching element being rotatably and/or shiftably executed to the second latching element. A rotatability or shiftability is, in particular, produced or cancelled according to the position of the bayonet latching system.

An advantageous embodiment envisages that in the closure position of the bayonet latching system the first latching element assumes a closure angular position in respect of the second latching element and in the intermediate position of the bayonet latching system the first latching element assumes an intermediate angular position in respect of the second latching element, whereby the closure angular position and the intermediate angular position respectively form two different relative positions of the first latching element in respect of the second latching element. A practical embodiment envisages that the first latching element can be transferred from the closure angular position to the intermediate angular position by means of the electrical drive and the additional mechanical operative connection.

For example, the additional mechanical operative connection from the electrical drive to the first latching element can be provided by means of a gearbox. The gearbox is preferably designed as a reduction gearbox. In a further variant, the additional mechanical operative connection can also be provided between the catch drive gearwheel with which the catch means of the electrical drive is drivable and the first latching element. In this case, the additional mechanical operative connection is preferably designed as a reduction gearbox, the input speed of which is the speed of the catch drive gearwheel and the output speed is the speed of the first latching element.

According to a further variant, the bayonet latching system forms a first shifting connection between the first latching element and the second latching element which is blocked in the intermediate position and released in the release position.

An advantageous embodiment envisages that the bayonet latching system has a blocking element. The blocking element preferably blocks the first shifting connection in the intermediate position and releases the first shifting connection in the release position. In a special design, the blocking element can be moved manually in the intermediate position by means of the handle or the triggering lever, in particular to transfer the bayonet latching system from the intermediate position into the release position.

Furthermore, it can be provided for that the bayonet latching system forms a first rotational connection between the first latching element and the second latching element, which is blocked in the release position and the intermediate position and can preferably be released in the closure position. In particular, release of the first rotational connection can be coupled to a release of the catch, i.e. that the first rotational connection is released where the catch is released from the pawl. In this embodiment, the bayonet latching system can be transferred from the closure position to the release position by means of adjustment of the first rotational connection and subsequent adjustment of the first shifting connection.

Independently of this, but also in combination with the previous embodiment, it is possible that the bayonet latching system forms a second shifting connection between the first latching element and the second latching element which is blocked in the intermediate position and released in the closure position. In this embodiment, the bayonet latching system can be transferred from the closure position to the release position by means of operation of the second rotational connection, subsequent operation of the first rotational connection and subsequent operation of the first shifting connection. In this embodiment, manual operation of the first rotational connection and subsequent manual operation of the first shifting connection is preferably provided for. By means of this dual manual operation of the bayonet latching system to unbolt the front hood, greater safety of the safety device can be provided. Advantageously, in this embodiment the second latching element is rotatable and shiftable by means of the handle.

Independently of this, but also in combination with at least one of the previous embodiments, it can be provided for that the bayonet latching system forms a second rotational connection between the first latching element and the second latching element which is blocked in the closure position and released in the intermediate position.

Other advantages, characteristics and details of the invention result from the following description at least of a preferred exemplary embodiment to which the invention is not restricted, however, and on the basis of the figures.

Figure 2:
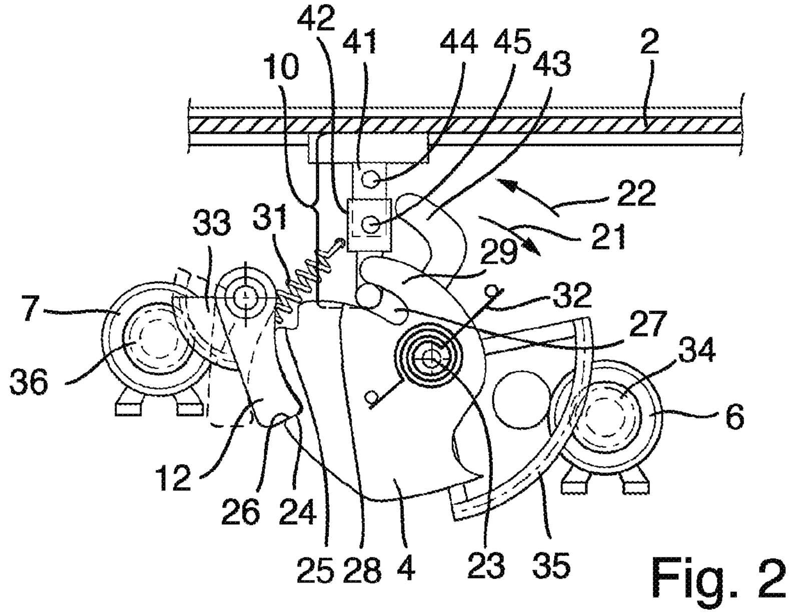
Figure 3:
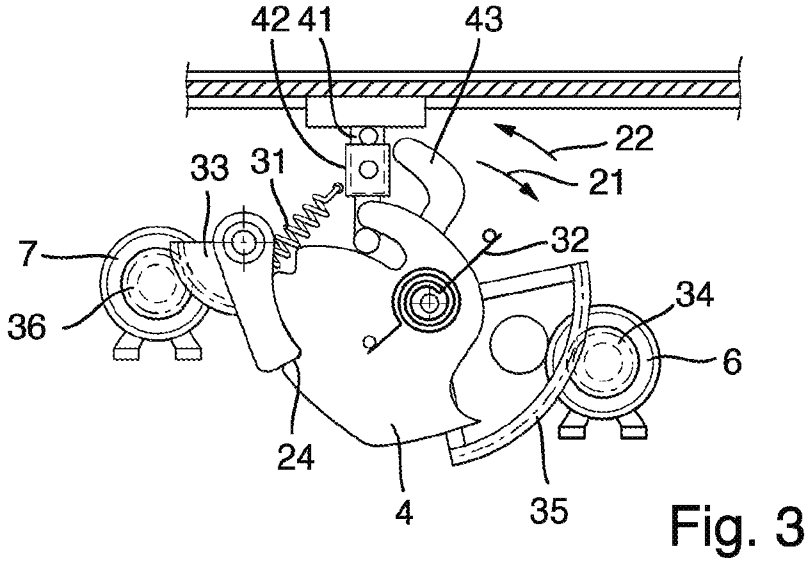
Figure 4:
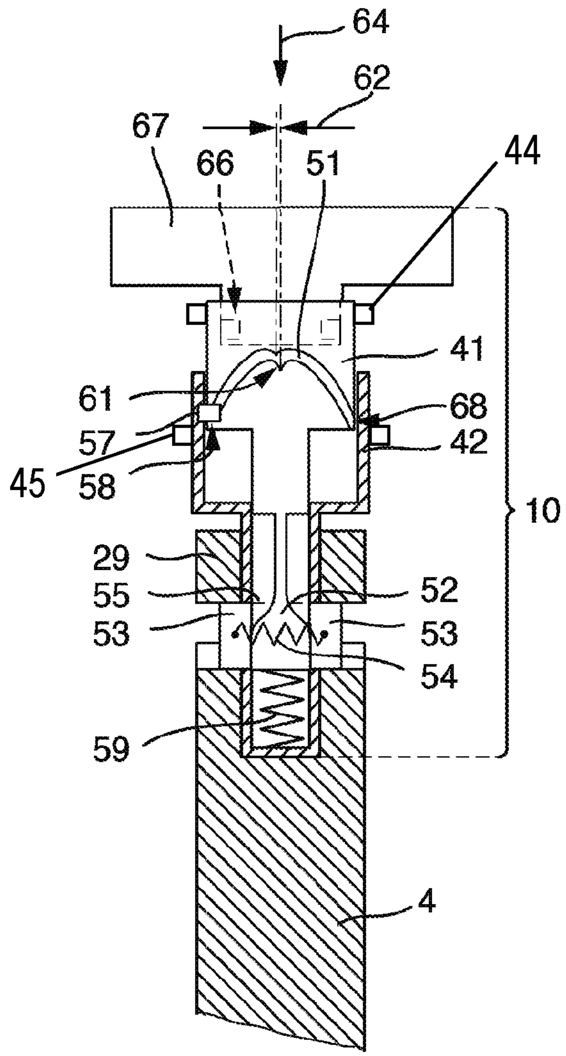
Figure 5:
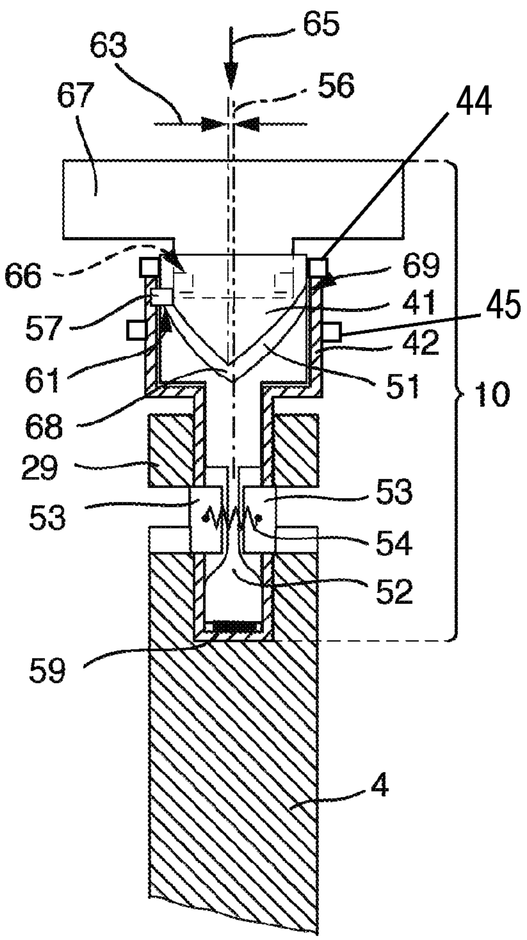
Figure 6:
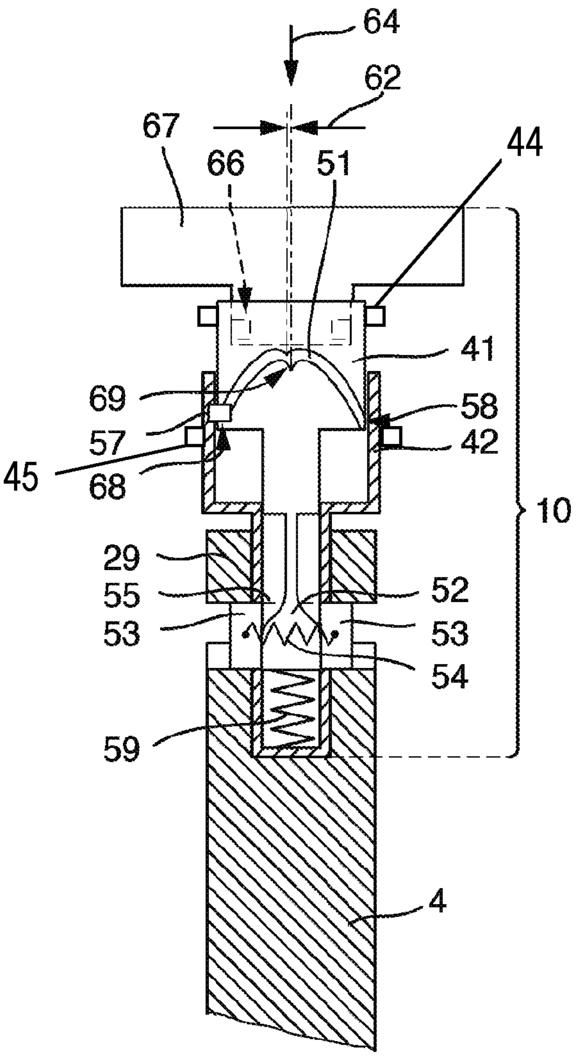
Figure 7:
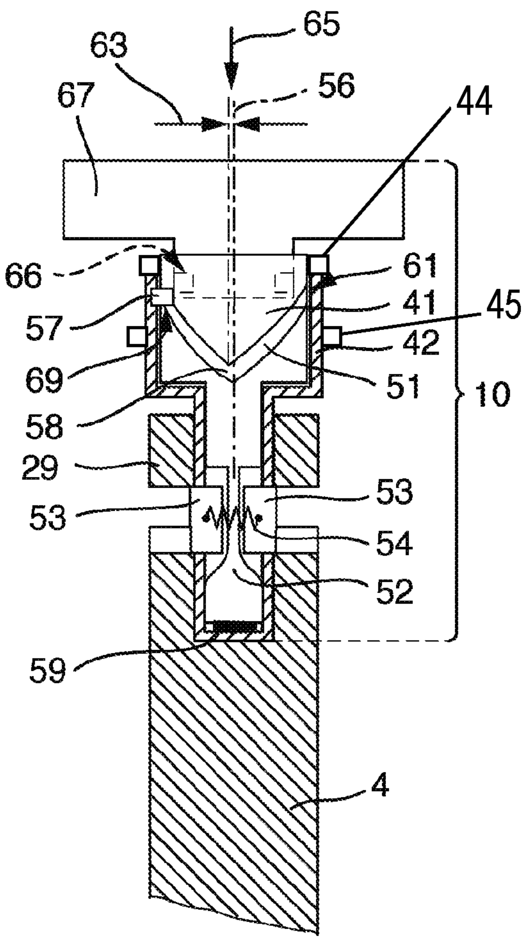
Figure 8:
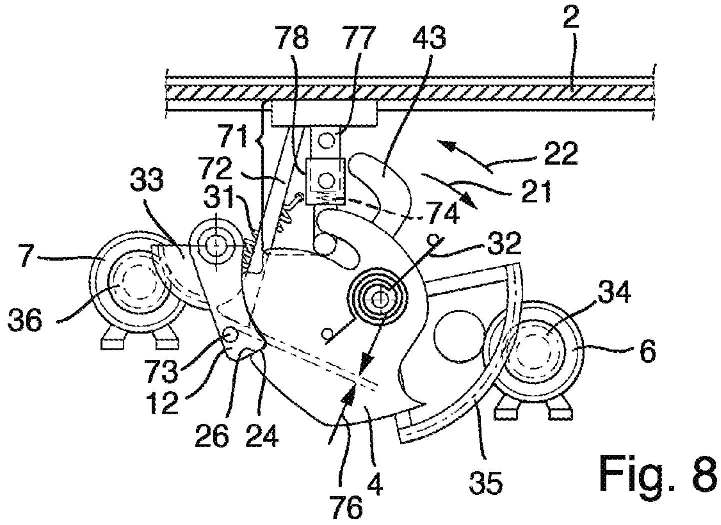
Figure 9:
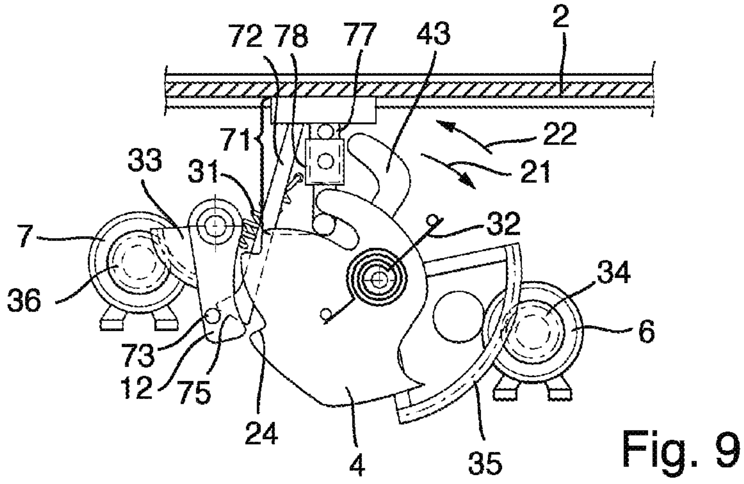
Figure 10:
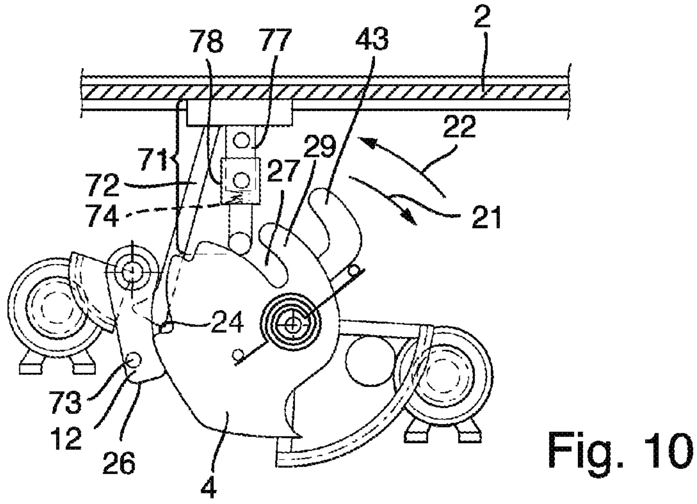

These show in:

FIG. 1 a sectional view of a safety device;

FIG. 2 a sectional view of a section of the safety device according to FIG. 1 with a bayonet latching system in a closure position;

FIG. 3 a sectional view of a section of the safety device according to FIG. 1 with a catch in a pre-ratchet position;

FIG. 4 a sectional view of a section of the safety device according to FIG. 1 with the catch according to FIG. 3 in a main ratchet position;

FIG. 5 a section of the safety device according to FIG. 1 with an additional mechanical operative connection between a first electromotor and the bayonet latching system;

FIG. 6 a front hood in an intermediate position;

FIG. 7 the bayonet latching system in a release position;

FIG. 8 the front hood in an open position;

FIG. 9 an interaction of a coil with a towing arm during movement of the front hood in the direction of a closure position;

FIG. 10 the bayonet latching system during adjustment into the closure position.

FIG. 1 shows a sectional view of a safety device 1 for a motor vehicle with a front hood 2, a hood latch 3 and a handle 14. The hood latch 3 has a catch 4, a bayonet latching system 13 and an electrical drive 5 which has a first electromotor 6 and a second electromotor 7. The front hood 2 is closed in the position shown by means of solid lines in FIG. 1, i.e. it is located in a closure position. In the closure position an elastic element 8, such as a sealing rubber which is arranged in the closure position between a stationary component 9 of the safety device 1 and the front hood 2 is compressed. The open position of the front hood 2 is depicted in dot-dashes in FIG. 1. Furthermore, the hood latch 3 has a pawl 12 and a latch holder 10 which is executed as a latch bracket, for example, and is arranged via a coupling element 11 of the safety device 1 on the front hood 2. The catch 4 and the pawl 12 are respectively rotatably arranged on a non-illustrated stationary component of the safety device 1. The catch 4 is located in a main ratchet position in the position shown in FIG. 1.

FIG. 2 shows a sectional view of a section of the safety device 1 shown in FIG. 1 with the bayonet latching system 13 in a closure position. The bayonet latching system 13 has a first latching element 15 which is rotatably arranged on a non-illustrated stationary component of the safety device 1, a second latching element 16, a blocking element 17, a knob 18, which is firmly connected to the second latching element 16, a guide slit 19 to guide the knob 18 and a towing arm 20. The second latching element 16 is conducted shiftably to the first latching element 15 and partly within the first latching element 15.

The bayonet latching system 13 has three positions according to the invention, namely a closure position, a release position and an intermediate position. In the closure position, a first shifting connection is blocked between the first latching element 15 and the second latching element 16. Hereinafter, the interaction of the electrical drive 5 with the catch 4, the latch holder 10 and the front hood 2 will be explained initially and subsequently the functionality of the bayonet latching system 13.

FIG. 3 shows a sectional view of a section of the safety device 1 which illustrates the front hood 2, the catch 4 and the electrical drives 5. The catch 4 has a rotational point 23, an opening rotational direction 21 and an opposite closure rotational direction 22. The catch 4 has a pre-ratchet contour 24 and a main ratchet contour 25 which can respectively interact with a counterratchet contour 26 of the pawl 12 and an infeed section 27 which is formed by a collecting arm 28 and a load arm 29. The front hood 2 is located in the position shown in FIG. 2 in an intermediate position between the open position and the closure position and is bolted to the latch holder 10 but not closed by means of the engagement of the catch 4.

The catch 4 is located in a pre-ratchet position in FIG. 3. In the pre-ratchet position, the pawl 12 is kept compressed against the catch 4 by means of a pawl spring element 31, such as a tension, pressure or spiral spring. In addition, the catch 4 is spring-impinged by means of a catch spring element 32, such as a tension, pressure or spiral spring, in an opening direction 21, whereby the pre-ratchet contour 24 is pressed against the counterratchet contour 26. In the pre-ratchet position, the front hood 2 is bolted and blocked in the direction of the open position.

FIG. 4 shows a sectional view of a section of the safety device 1 with the catch 4 in the main ratchet position. The main ratchet position is attained by the catch 4 starting from the pre-ratchet position being further rotated in the closure rotational direction 22 according to FIG. 3. In one embodiment, this can be caused by depression of the front hood 2 and in another embodiment by driving of the catch 4 by means of the first electromotor 6. A movement of the catch 4 in the direction of the main ratchet position can also be caused by means of a combination of a manual depression and electrical driving of the first electromotor 6.

During the rotation of the catch 4 in the closure rotational direction 22 to at least beyond the main ratchet position of the catch 4 the main ratchet contour 25 passes the counterratchet contour 26, whereby the main ratchet contour 25 is located in front of the counterratchet contour 26 in the closure rotational direction 22, so that the pawl 26 can ratchet into the main ratchet contour 24 and the catch 4 assumes the main ratchet position. The front hood 2 is bolted and closed in the main ratchet position and blocked in the direction of the open position.

If the front hood 2 is unbolted starting from the main ratchet position, the catch 4 is initially transferred from the main ratchet position to the pre-ratchet position. This is caused in the embodiment shown in FIG. 1 to FIG. 4 by the second electromotor 7 moving the pawl 12 into the dot-dashed position shown in FIG. 4 by means of a pawl pinion shaft gearwheel 36 and a pawl drive gearwheel 33. The catch 4 is therefore released in the opening rotational direction. In a special embodiment, the first electromotor 6 causes switchover of the catch 4 from the main ratchet position shown in FIG. 4 to the pre-ratchet position shown in FIG. 3, whereby the safety device 1 has a mechanical operative connection between the electrical drive 5 and the catch 4 during this switchover. The mechanical operative connection is formed by a pinion gearwheel 34 which is connected to the pinion shaft of the first electromotor 6 in a form-fitting manner and a catch drive gearwheel 35 which is connected to the catch 4 in a form-fitting manner, whereby the pinion shaft gearwheel 34 combs with the drive gearwheel 35.

The functionality of the bayonet latching system 13 will be described hereafter. FIG. 5 shows a section of the safety device 1 with an additional mechanical operative connection 51 between the first electromotor 6 and the bayonet latching system 13. The additional mechanical operative connection 51 is formed by the pinion gearwheel 34, a first gearbox gearwheel 52, a second gearbox gearwheel 53, a third gearbox gearwheel 54, a coupling rod 55, a fourth gearbox gearwheel 56 and a fifth gearbox gearwheel 57, whereby with the aid of the additional mechanical operative connection 51 a torque can be transferred from the pinion gearwheel 34 to the fifth gearbox gearwheel 57.

The pinion gearwheel 34 combs with the first gearbox gearwheel 52, whereby a gearbox connection is formed as a reduction gearbox from the pinion gearwheel 34 to the first gearbox gearwheel 52. The second gearbox gearwheel 53 is connected to the first gearbox gearwheel 52 in a form-fitting manner and combs with the third gearbox gearwheel 54. The third gearbox gearwheel 54 is connected to the fourth gearbox gearwheel 56 by means of the connecting rod 55 which combs with the fifth gearbox gearwheel 57. The fourth gearbox gearwheel 56 forms a bevel gear wheel gearbox with the fifth gearbox gearwheel 57, whereby the fifth gearbox gearwheel 57 is executed as a pinion and the fourth gearbox gearwheel 56 as a crown gear. By means of the additional mechanical operative connection 51, a mechanical coupling of a rotation of the catch 4 is provided which is also driven by means of the pinion gearwheel 34, with a rotation of the first latching element 15.

The bayonet latching system 13 shown in FIG. 5 is located in the closure position in which the knob 18 is held in a recess 58 of the guide slit 19 in a spring-impinged manner by means of a tensioned pressure spring 59. The pressure spring 59 is braced on one side on a base of the first latching element 15 and in the tensioned state acts on the second latching element 16 into a direction away from the base of the first latching element 15. In the closure position of the bayonet latching system 13 the first latching element 15 assumes a closure angular position in respect of the second latching element 16 which is illustrated in FIG. 5*a*. FIG. 5*a* shows a sectional view of the first latching element 15 and the second latching element 16 with the knob 18 from one viewing direction of the fifth gearbox gearwheel 57.

Starting from the closure angular position shown in FIG. 5*a* and FIG. 5, during rotation of the catch 4 from the main ratchet position to the pre-ratchet position the first latching element 15 in respect of the second latching element 16 is rotated in the plane shown in FIG. 5*a* and FIG. 5*b* in a clockwise direction from the closure angular position to the intermediate angular position which is illustrated in FIG. 5*b*. In this rotation, the knob 18 and the second latching element 16 remain. In this rotation, the first latching element 15 crosses over an angular area 60 with the guide slit 19. In an adjustment of the bayonet latching system 13 from the intermediate position to the closure position the first latching element 15 also crosses over the angular area 60, only in the opposite direction, i.e. in an anti-clockwise direction in the plane shown in FIG. 5*a* and FIG. 5*b*. A first rotational connection is formed between the first latching element 15 and the second latching element 16 by means of adjustability of the first latching element 15 in respect of the second latching element 16 from the closure angular position to the intermediate angular position.

The mechanical coupling between the catch 4 and the first latching element 15 is especially advantageously provided in such a way that during movement of the catch 4 a speed of the first latching element 15 is multiple times less, for example by the factor 2, 3, 4 or up to 10, than a speed of the catch 4. The mechanical coupling is preferably provided for such that an angular area which is crossed by the catch drive gearwheel 35 during rotation of the catch 4 from the main ratchet position into the pre-ratchet position, as for example from approximately 20 to 40 degrees, corresponds to the angular area 60, which is crossed over by the first latching element 15 during rotation from the closure position to the intermediate position of the bayonet latching system 13, such as from approximately 2 to 20 degrees. During rotation of the catch 4 from the pre-ratchet position to the main ratchet position the same applies to the relationship between the angular area 60 and the angular area of the catch drive gearwheel 35. The rotational directions of the individual gearbox gearwheels during rotation of the catch 4 from the main ratchet position into the pre-ratchet position are depicted in FIG. 5 by means of arrows.

Starting from the closure position of the bayonet latching system 13 shown in FIG. 5 the first latching element 15 is rotated as described above into the intermediate angular position in respect of the second latching element 16, so that the bayonet latching system 13 is located in the intermediate position.

FIG. 6 shows the bayonet latching system 13 in the intermediate position and the catch 4 in the pre-ratchet position. The knob 18 is in the intermediate position of the bayonet latching system 13 acted on by the pressure spring 59 on the blocking element 17. The blocking element 17 is shown in a blocking position in FIG. 6 and in this position prevents relaxation of the pressure spring 59 and thus spring-assisted shifting of the second latching element 16 and a movement of the latch holder 10 in the direction of an opening position of the latch holder 10 with the aid of the second latching element 16. In other words, the blocking element 17 blocks the first shifting connection between the first latching element 15 and the second latching element 16 in the direction of the release position of the bayonet latching system 13 in the intermediate position of the bayonet latching system 13.

In FIG. 6, the front hood 2 is shown in an intermediate position, i.e. in a position between the closure position and the open position of the front hood 2. The catch 4 is located in the pre-ratchet position and the latch holder 10 is held in a closure position in a spring-impinged manner by means of a latch holder spring 63 in which the front hood 2 is bolted. The front hood 2 is slightly elevated in the pre-ratchet position of the catch 4 compared to the closure position of the front hood 2 and the handle 14 is accessible and manually movable for an operator. The handle 14 is mechanically coupled with the blocking element 17, preferably firmly connected, whereby the blocking element 17 can be manually moved in the intermediate position. From the position of the handle 14 shown in FIG. 6 the handle can be transferred into a position in which a welt 62 of the handle 14 strikes a lower edge of the front hood 2, whereby this position is illustrated in FIG. 6 with the dot-dashed position of the welt 62. In this position of the handle 14 the blocking element 17 in the position shown in FIG. 6 is arranged shifted upwards by a path $L_2$ in which the knob 18 is released in the direction of a vertical extension of the guide slit 19, which is shown in FIG. 7. During a movement of the blocking element 17 aligned upwards around the path $L_2$ the mechanical coupling of the welt 62 with the blocking element 17 causes a movement of the welt 62 around the path $L_1$, whereby the paths $L_1$ and $L_2$ are of the same magnitude.

FIG. 7 shows the bayonet latching system 13 in the release position; starting from the intermediate position according to FIG. 6, the knob 18 and the second latching element 16 are moved by means of spring force of the tensioned pressure spring 59 along the vertical extension of the guide slit 19. The second latching element 16 pushes the latch holder 10 from the closure position into the opening position which is shown in FIG. 7, whereby the latch holder 10 is shiftably accommodated on the front hood 2 by means of the coupling element 11. The force exerted by the pressure spring 59 is considerably greater in all positions of the bayonet latching system 13 than the retention force of the latch holder spring 63. In the release position of the bayonet latching system 13 the latch holder 10 is located in the opening position and the front hood 2 is unbolted and released for opening. A shifting of the blocking element 17 by means of the handle 14 according to this causes transfer of the bayonet latching system 13 from the intermediate position to the release position, i.e. the bayonet latching system 13 can be manually transferred from the intermediate position to the release position.

FIG. 8 shows the front hood 2 in the open position. The towing arm 20 which is shiftably accommodated in the second latching element 16 is located in a towing position which is illustrated by means of dot-dashed lines in FIG. 8 in the open position of the front hood 2. Starting from a passive position of the towing arm 20, which is illustrated in FIG. 8 with dot-dashed lines and in FIGS. 6 and 7 with solid lines, a core 83 of a Bowden cable 81 pushes the towing arm 20 into the towing position with a cover 82 during opening of the front hood 2. A movement of the front hood 2 is coupled with a movement of a rear end 85 of the core 83 during opening of the front hood 2 by means of a slide 84, which is firmly connected to a rear edge of the front hood 2.

During closure of the front hood 2 a contact is detached between the slide 84 and the rear end 85 of the core 83 and the towing arm 20 remains in the towing position. In FIG. 8 it continues to be shown how a coil 86 is pivotably arranged by means of a rod 87 on the front hood 2. The rod 87 is held by means of a rod spring 88 in the position shown in FIG. 8 against a stop 89.

FIG. 9 shows an interaction of the coil 86 with the towing arm 20 during movement of the front hood 2 in the direction of the closure position of the front hood 2. Even before the latch holder 10 comes into contact with the catch 4, the coil 86 touches the towing arm 20. After the coil 86 has touched the towing arm 20, the front hood 2 is moved further in the direction of the closure position and the coil 86 pushes the second latching element 16 by means of the towing arm 20 against the spring force of the pressure spring 59. In a position of the front hood 2 in which the front hood 2 does not yet touch the welt 62, during the closure process of the front hood 2 the knob 18 is located on the side of the blocking element 17 turned towards the pressure spring 59, as shown in FIG. 10.

FIG. 10 shows the bayonet latching system 13 during adjustment into the closure position. The shifting of the second latching element 16 into the position shown in FIG. 10 releases a movement of the latch holder 10 driven by means of the latch spring 63 from the opening position illustrated in dot dashes in FIG. 10 to the closure position which is marked by means of dot-dashed lines in FIG. 10. The knob 18 glides along the guide slit 19 in the direction of the pressure spring 59 and can assume the position shown in dot dashes in FIG. 10. The pushing of the second latching element 16 by means of the front hood 2, the rod 87, the coil 86 and the towing arm 20 causes tensioning of the pressure spring 59. The effect of the weight force of the front hood 2 on the second latching element 16 is considerably greater than the counteracting spring force of the pressure spring 59.

Starting from the position shown in FIG. 10, during rotation of the catch 4 from the pre-ratchet position to the main ratchet position the front hood 2 is pulled into the closure position and pushes the welt 62 downwards, whereby the blocking element 17 is transferred into the blocking position shown in FIG. 6. In addition, a lever 91 arranged on the front hood 2 moves the towing arm 20 into the passive position which is illustrated in dot dashes in FIG.

10. In the passive position, a movement of the coil 86 is released in relation to the second latching element 16, so that during adjustment of the bayonet latching system 13 from the intermediate position into the release position and during movement of the front hood 2 to the closure position the coil 86 can roll off on a surface 92 of the second latching element 16. In the movement of the front hood 2 into the closure position the coil 86 is immersed into the interior of the second latching element 16.

The towing arm 20 preferably has a boom which interacts with the lever 91 in such a way that during shifting of the towing arm 20 into the passive position the boom can be sunk in the towing arm and during movement of the front hood 2 from the closure position into the direction of the open position the lever 91 passes the boom without adjusting the boom and thus the towing arm so that the towing arm 20 remains in the passive position.

The first latching element 15 is rotated in respect of the second latching element 16 into the closure angular position by means of the additional mechanical operative connection 51 during rotation of the catch 4 which is shown in FIG. 5 or FIG. 5*a* and thus transfers the bayonet latching system 13 into the closure position.

In the embodiment shown in FIGS. 1 to 10, the catch 4 can have an opening end position with the pre-ratchet position. As the latch holder 10 strikes the second latching element 16 during movement of the front hood 2 in the direction of the closure position as shown in FIG. 9, the latch holder can be moved from a position as shown in FIG. 9 by means of a further movement of the front hood 2 in the direction of the closure position from the closure position in the direction of the opening position. This depends in particular on a geometric arrangement of the latch holder 10, of the coupling element 11, of the rod 87 and the bayonet latching system 13 to one another.

It is also possible that the catch 4 has an opening end position in the embodiment shown in FIGS. 1 to 10 in which the catch 4 is rotated further in an opening rotational direction 21 from the pre-ratchet position. In this embodiment the pawl 12 can be operated by means of the second electromotor 7, for example, as soon as the front hood 2 has reached the open position, and a rotation of the catch 4 is released into the opening rotational position 21 so that the catch 4 is transferred into the opening end position. In the opening end position the latch holder 10 can also be accommodated by the catch 4 without striking on the second latching element 16 by means of the collecting arm 28.

The invention claimed is:

1. A safety device for a motor vehicle, which has a front hood with an open position and a closed position, the safety device comprising:
   - a hood latch including a striker, a catch with a pre-ratchet position and a main ratchet position in which the front hood is locked and closed, and an electrical drive which causes switchover of the catch from the main ratchet position into the pre-ratchet position, and
   - an actuator movable on the striker, and
   - at least one locking element provided on the striker and configured to engage the catch and to be moved by the actuator,
   - wherein in a first position of the actuator and in the pre-ratchet position of the catch, the at least one locking element being configured to engage with the catch and the front hood is locked, and
   - wherein in a second position of the actuator, the actuator moves the at least one locking element out of engagement with the striker is released from the catch and the front hood is unlocked, and the front hood is coupled with the actuator such that in the pre-ratchet position of the catch, displacement of the front hood in the direction of the closed position of the front hood causes displacement of the actuator from the first position to the second position.

2. The safety device according to claim 1, wherein the front hood is manually displaceable in the direction of the closed position in the pre-ratchet position of the catch.

3. The safety device according to claim 1, wherein the actuator is ratchetable and the striker has a control contour and a guide element, whereby the guide element interacts with the control contour such that a ratcheting of the actuator is enabled at least in the first position and/or the second position of the actuator.

4. The safety device according to claim 1, wherein the front hood is coupled with the actuator such that in the pre-ratchet position of the catch a displacement of the front hood in the direction of the closed position causes a displacement of the actuator from the second position to the first position.

5. The safety device according to claim 1, wherein the catch assumes an opening end position with the pre-ratchet position in which the catch is immobile in the opening rotational direction.

6. The safety device according to claim 1, wherein the catch has an opening end position in addition to the pre-ratchet position and the main ratchet position in which the catch is rotated into an opening rotational direction in respect of the pre-ratchet position.

7. The safety device according to claim 1, wherein the hood latch has a pawl to lock the catch and a displacement of the actuator from the first position to the second position causes detachment of the pawl from the catch.

8. The safety device according to claim 1, wherein the hood latch has a direct mechanical operative connection between the electrical drive and the catch during switchover of the catch from the main ratchet position into the pre-ratchet position.

9. The safety device according to claim 1, wherein the hood latch has a direct mechanical operative connection between the electrical drive and the catch during switchover of the catch from the pre-ratchet position into the main ratchet position.

* * * * *